Nov. 28, 1961 J. W. JELINEK 3,010,368
HIGH TEMPERATURE PERISCOPE
Filed June 16, 1960 2 Sheets-Sheet 1

INVENTOR.
James W. Jelinek
BY
HIS ATTORNEYS

Nov. 28, 1961   J. W. JELINEK   3,010,368
HIGH TEMPERATURE PERISCOPE
Filed June 16, 1960   2 Sheets-Sheet 2
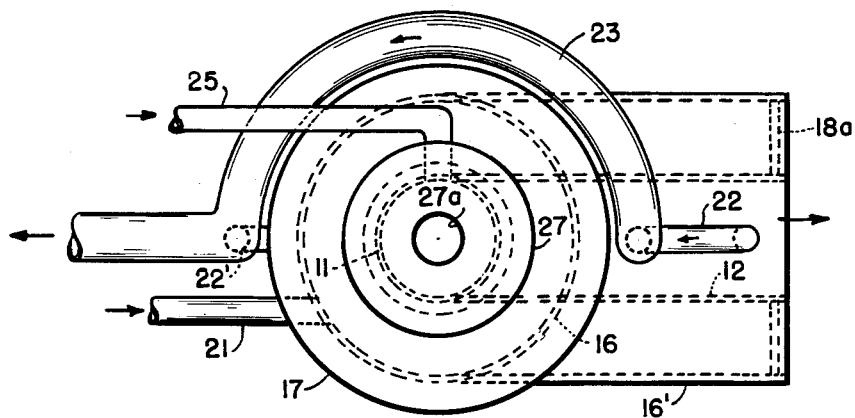
Fig. 2
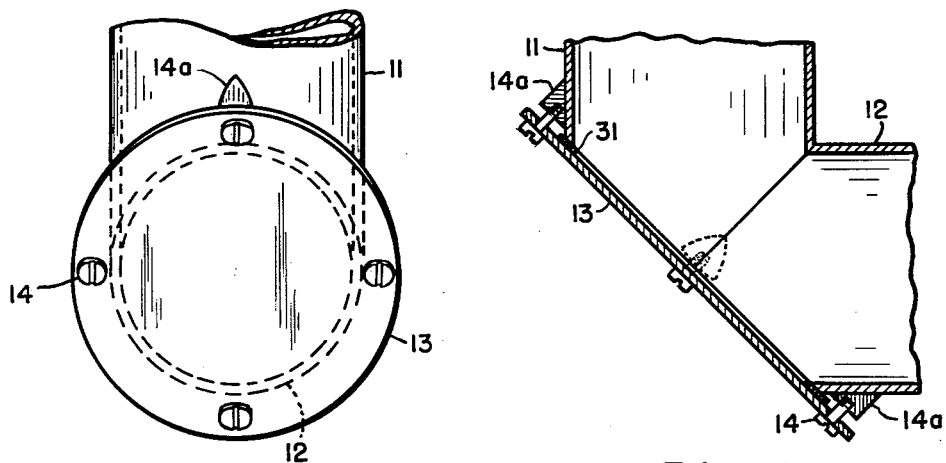
Fig. 4
Fig. 3
INVENTOR.
James W. Jelinek
BY
HIS ATTORNEYS 3,010,368
HIGH TEMPERATURE PERISCOPE
James W. Jelinek, Muncie, Ind., assignor to Ball Brothers Company, Incorporated, Muncie, Ind., a corporation of Indiana
Filed June 16, 1960, Ser. No. 36,650
5 Claims. (Cl. 88—69)

This invention relates to apparatus for viewing the interior of chambers which during the inspection thereof may exist at a high temperature such, for example, as exists in the combustion space of a glass melting furnace, i.e., a temperature ranging from 2500° up to more than 3000° F.

An object of the invention is to produce what may be termed a high temperature periscope, which is of a weight such as will contribute to ease of handling by a single individual and which is constructed so as to withstand temperatures such as noted. The apparatus is also of such size that it may be inserted through a small aperture (6" x 6") formed in the side wall of a furnace while the individual using the scope may stand at a distance of approximately four feet away from the furnace.

A further object is to produce a high temperature periscope for viewing the interiors of various types of combustion chambers and particularly portions thereof which are normally inaccessible, i.e., hidden from view.

A further object is to provide a periscope which will give the observer a relatively large and clear view of interior portions and surfaces of furnaces or combustion chambers under observation.

These and other objects are attained by means of apparatus such as disclosed in the accompanying drawings in which FIGURE 1 is a longitudinal sectional view of a periscope embodying my invention.

FIGURE 2 is a top plan view of the apparatus shown in FIGURE 1. Portions of the apparatus are shown as if broken away for convenience of illustration.

FIGURE 3 is a fragmental sectional view of a portion of the periscope shown in FIGURE 1 and discloses the mirror which forms a part of the apparatus and convenient means for securing the mirror in place on walls of the viewing passage and at the junction of the two hollow members enclosing that passage.

FIGURE 4 is a rear view of the mirror shown in FIGURE 3, in connection with a portion of one of the hollow tubular members to which it is secured.

Figure 1:
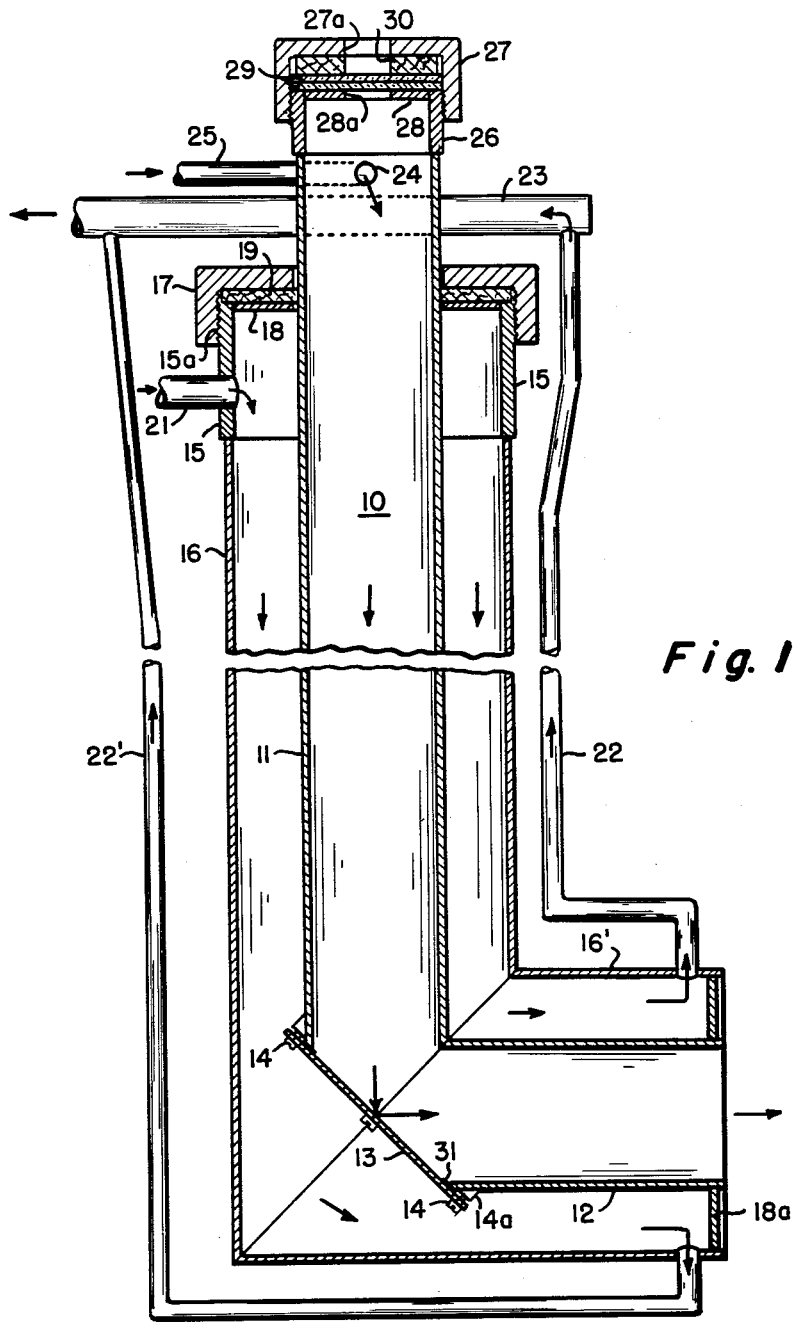

The periscope disclosed as an embodiment of my invention includes a viewing passage which is fully open at one end and is provided at the other end with an eye piece having a viewing aperture formed therein. The passage is enclosed by two hollow members which extend at an angle to each other and a mirror is located at the junction of the hollow members which extend at right angles to each other in the illustrated embodiment. The mirror is so positioned with relation to the hollow members that the reflecting surface thereof extends at an angle of 45° to the longitudinal axis of each such member.

A feature of the apparatus illustrated as an embodiment of the invention is that the open ended tubular member located at the objective end of the viewing passage, is short and the longitudinal axis thereof extends at right angles to the other passage-enclosing, tubular member, which is considerably longer and both the tubular members are surrounded by a jacket through which cooling liquid, preferably water, is adapted to be circulated during use of the apparatus in viewing the interiors of heated chambers. The jacket is so located that it extends around the entire exterior surface of the shorter tubular member and extends around the major portion of the longer tubular member. The inlet and outlet ports for the cooling liquid are so located in the jacket that the flow of such liquid through the jacket washes the entire external surface of the shorter tubular member, the entire rear surface of the mirror, and the major portion of the outer surface of the longer of the two tubular members.

In addition, the interiors of the tubular members are subjected to a flow of fluid under pressure, preferably compressed air, which is so delivered to the viewing passage that the flow washes substantially the entire inner surface of the longer tubular member, substantially the entire reflecting surface of the mirror and the entire inner surface of the shorter tubular member. The compressed air is discharged from the viewing passage through the open end of the shorter tubular member.

The water jacket is provided with a water-tight slip or expansion joint which surrounds the longer of the two tubular members and is located adjacent the eye piece secured to that member. The expansion joint permits longitudinal movement between the jacket and the longer of the two tubular members. The jacket is so spaced from both the tubular members that relative expansion between the shorter of the tubular members and the surrounding portion of the jacket can occasion adequate lateral or tilting movement of the longer of the two tubular members, without destroying the effectiveness of the water-tight expansion joint.

As disclosed in the drawings, the viewing passage 10 enclosed by the longer tubular member 11 and short tubular member 12 consists of two parts which extend at a right angle to each other. The shorter part of the passage is enclosed by the shorter member 12 which is secured to the end of the longer member 11 and extends at right angles thereto. A mirror 13 is secured to both the members 11 and 12 at their junction and closes an opening formed by the cutting away of a portion of each of the members 11 and 12 at their junction and the mirror is so located that its reflecting surface is located within the passage 10 and extends at a 45° angle to the axis of each member 11 and 12. In addition, the axes of the two members intersect at a point on the reflecting surface of the mirror located intermediate its edges. As indicated, the angles between the mirror surface and the axes of the two members 11 and 12, are equal.

In the illustrated embodiment of the invention the mirror is composed of stainless steel with one surface highly polished, and the polished or mirror surface is located within and forms a part of the closing wall of the viewing passage. As shown in FIGURES 1, 3, and 4, the mirror is secured to the members 11 and 12 by bolts 14 which pass through the mirror and engage nuts 14a which are brazed to the closing members 11 and 12 of the viewing passage.

The members 11 and 12 are formed of thin metal and, in the apparatus forming the now preferred embodiment of my invention, the members 11 and 12 are formed of thin wall electrical conduits 1¾ inches in diameter. To conserve weight, the outer enclosing wall 16—16' of the water jacket may also be formed of thin wall electrical conduits of 2 inches in diameter, thus providing adequate space between the exterior surface of the members 11 and 12 and the inner face of the jacket to accommodate an adequate flow of cooling water throught the jacket. The thin wall members 11 and 12 also contribute to the light weight of the apparatus.

The end of the jacket remote from the member 12 is provided with a cast iron pipe nipple 15 the lower edge of which, as shown in the drawings, is welded to the upper edge of the longer portion 16 of the tubular jacket and is provided at the end thereof opposite the weld joint with pipe threads 15a which are engaged by and secure a standard pipe cap 17 to the nipple.

The pipe cap is provided with a central, circular aperture through which the upper end of the member 11 extends, and a spacer member 18 is secured to the upper edge of the nipple 15, thus forming a closure for the upper end of the water jacket. The spacer member 18 is provided with a central, circular aperture aligned with the aperture of the pipe cap 15 and through which the member 11 passes. The circular apertures in cap 17 and spacer member 18 are aligned and both are of slightly larger diametre than the external diameter of member 11. A packing 19 is located between the inner surface of the pipe cap 17 and the spacer 18. This packing surrounds and slidably engages the external surface of the member 11, thus insuring effective packing of the water jacket while permitting movement between the jacket and the member 11 caused by dimensional changes.

The open end of the member 12 is surrounded by an annular spacer member 18a, the opposed edges of which are brazed to the inner surface of the closure member 16′ of the water jacket and the outer surface of the member 12, thus forming the closed end of the water jacket located at the open end of the member 12. The reason for the brazing operations in connection with the pipe nipple 15, the spacer members 18 and 18a is because of the thin walls of the members enclosing the water jacket and it is noted that these structural features are for the purpose of keeping the weight of the periscope down so that it may be easily handled.

The water jacket is supplied with water through an inlet pipe 21 which preferably passes through an aperture formed in the nipple 15 and is welded at its delivery end to the nipple. As disclosed in FIGURE 1 of the drawings, the arrangement of the water passages is such that the water delivered through the passage 21 passes downwardly around the external surface of the portion of the member 11 enclosed by the jacket, around the rear surface of the mirror 13 and around the entire external surface of the member 12. This is accomplished by providing two outlet passages 22 and 22′ which communicate with the interior of the jacket as shown in FIGURE 1. The inlet end of the pasage 22 is shown in the illustrated embodiment as communicating with the interior of the jacket immediately adjacent the spacer member 18a, and the inlet end of the member 22′ also communicates with the jacket at a point adjacent to the spacer member 18a but preferably diametrically opposite to the point at which the passage 22 communicates with the interior of the jacket.

The outlet ends of the pipe 22 and 22′ communicate with a water outlet manifold 23 located near the closure cap 17 and adapted to receive and then discharge the cooling liquid after it has passed through the water jacket. When the jacket is receiving adequate cooling water, approximately 2½ gallons per minute during the period of use, the water will substantially fill the jacket and will swirl around the outer surfaces of the members 11 and 12 and thoroughly wash the rear surface of the mirror and, under the conditions indicated, will maintain the periscope cool enough to be handled during and immediately after being used to observe the interior of a furnace.

In addition to the water cooling of the members 11 and 12, the interiors thereof are subjected to a flow of compressed air while the periscope is in use. The eye piece end of the member 11 is therefore closed in such a way as to not only provide for effective viewing through the members 11 and 12 but also to direct the air flow delivered to the interior of said members out through the open end of the member 12. The compressed air, or other cooling fluid, is delivered to the interior of the member 11 through an air inlet port 24 which receives the cooling fluid through a pipe or other conduit 25. In connection with apparatus such as illustrated the compressed cooling fluid is preferably delivered at a pressure and under conditions such that a moderate blast of cooling air or other fluid, can be felt at a distance of from about 10 to 12 inches from the open end of the member 12 when the scope is ready for use.

The eye piece end of the member 11 is fitted with a 1½ inch cast iron pipe nipple 26 which is brazed to the end of the member 11. As shown in FIGURE 1, the nipple is provided with screw threads at its upper end and receives a 1½ inch pipe cap 27 which is provided with a centrally located circular aperture 27a. The upper end of the nipple 26 is closed by a disc 28, brazed to the inner surface of the nipple 26. The brazing operation is such that the disc 28 extends across the end of the nipple in the plane of the upper edge thereof. The disc 28 is provided with a centrally located circular viewing aperture 28a which is aligned with the aperture 27a.

The eye piece is also provided with a shield formed of two discs 29 of colored glass which are preferably formed from cobalt blue glass. The discs 29 engage each other and are secured in place against the end of the member 11 by centrally apertured circular spacer 30 which fits within the annular flange of the cap 27 and engages the adjacent glass disc 29. The spacer 30 may be formed of wood. With such an arrangement the interior of the member 11 may be viewed through the apertures formed in the cap 27, the spacer 30, the glass discs 29, and the aperture 28a formed in disc 28 at the end of the member 11, it of course being understood that the centers of the apertures just mentioned are aligned with the longitudinal axis of the member 11.

In order to maintain the interior of the viewing passage 10 water-tight while the water jacket is filled with cooling water, the joint betwen the reflecting surface of the mirror 13 and the edges of the two members 11 and 12 is provided with a rubber gasket 31.

Immediately prior to using the periscope, cooling liquid is delivered to the interior of the jacket and an air flow such as described, is delivered to the interior of the two members 11 and 12. The flow of cooling liquid and also of air is maintained throughout the period of use of the periscope and, in this way, the apparatus is maintained at a temperature such that it may be conveniently handled by the viewer of the interior of a furnace.

While I have described but one embodiment of my invention, it will be apparent that various changes, additions, and omissions may be made in apparatus such as illustrated without departing from the spirit and scope of the invention as defined by the appended claims.

What I claim is:

1. A periscope for viewing the interiors of heated chambers which comprises, a tubular member open at one end and having an eye aperture at its opposite end, said tubular member comprising two tubular sections in open communication with each other and connected together along a mitered joint with the longitudinal axes of said tubular sections angularly intersecting, a reflector positioned adjacent the junction of said tubular sections and forming a wall surface of said tubular member, a water jacket surrounding exterior wall portions of said tubular member, and means for providing liquid coolant circulation through said water jacket and in direct contact with a back surface of said reflector.

2. A periscope for viewing interiors of heated chambers including a hollow member open at one end, said hollow member comprising two hollow sections in open communication with each other and connected together along a mitered joint with the longitudinal axes of said hollow sections angularly intersecting, a reflector secured to said hollow member within a cut-away portion adjacent said mitered joint with the back surface of said reflector forming an outside wall of said hollow member, a closure cap having a viewing aperture therein located at the end of said hollow member opposite the open end thereof, at least one disc of colored glass located within said member intermediate said aperture and said open end; means for creating fluid flow through said hollow member, across the reflecting surface of said reflector, and out the open end thereof; and water jacket means exteriorly of said hollow member for providing a flow of cooling liquid about the exterior surface of said hollow member and in direct contact with the back surface of said reflecting member.

3. A portable periscope for facilitating the viewing of interior portions of heated enclosures comprising, a tubular member having a long and a short tubular section in open communication with each other, said sections being connected together with their longitudinal axes extending at substantially right angles to each other, a mirror secured to said tubular member at the junction of said sections with the reflecting surface thereof located within said member and extending at an angle of about 45° to the longitudinal axis of each of said sections, the back surface of said mirror forming an exterior wall portion of said tubular member, an apertured closure on the end of one of said sections opposite its connection with the other section and located in a line of vision through said one section which intersects the mid reflecting surface of said mirror at an angle of approximately 45°, a colored glass partition within said member and a cross such line of vision, water jacket means surrounding at least a portion of the exterior surface of said tubular member for providing a flow of cooling liquid about such surface portion and in direct contact with the back surface of said mirror; and means for creating a flow of expansible fluid through a portion of the interior of said tubular member, across the reflecting surface of said mirror, and out through an open end portion of said member.

4. A portable periscope for viewing interiors of heated chambers including a tubular member, said tubular member comprising a pair of tubular sections connected together in open communication along a mitered joint with the longitudinal axes of said tubular sections angularly intersecting, a metal mirror secured to said tubular member at the junction of said sections with the back surface thereof forming an outer wall portion of said tubular member and the inner reflecting surface thereof extending at an identical angle to each of said longitudinal axes, a water jacket extending around exterior wall portions of said tubular member, and means for providing a flow of cooling liquid through said jacket in direct contact with exterior wall portions of said tubular member including the back surface of said metal mirror.

5. A portable periscope for viewing interiors of heated chambers comprising a tubular member having a pair of inter-connected tubular sections in open communication with each other, said tubular sections being connected together along a mitered joint with the longitudinal axes of said tubular sections angularly intersecting, a metal mirror forming a wall portion of said tubular member and secured to both of said tubular sections adjacent a cutaway portion of said mitered joint, the reflecting surface of said metal mirror being located within said tubular member and extending at a substantially identical angle with the longitudinal axis of each of said sections, the back surface of said mirror forming an outer wall of said tubular member, water cooling means for providing a flow of cooling water in direct contact with exterior surfaces of said tubular member including the back surface of said mirror, and separate means for providing a flow of air through said member and across the reflecting surface of said mirror and out through an open end of said member.

References Cited in the file of this patent

UNITED STATES PATENTS

| | | |
|---|---|---|
| 1,346,359 | Wenderhold | July 13, 1920 |
| 2,959,090 | Davies | Nov. 8, 1960 |

FOREIGN PATENTS

| | | |
|---|---|---|
| 796,406 | Great Britain | June 11, 1958 |
| 1,052,802 | Germany | Mar. 12, 1959 |